(No Model.)

A. H. WHATLEY.
BALL BEARING.

No. 556,117. Patented Mar. 10, 1896.

WITNESSES:
M. F. Bligh.
Chas. H. Luther Jr.

INVENTOR:
Alfred H Whatley
by Joseph H Miller & Co.
Attys.

UNITED STATES PATENT OFFICE.

ALFRED H. WHATLEY, OF PROVIDENCE, RHODE ISLAND.

BALL-BEARING.

SPECIFICATION forming part of Letters Patent No. 556,117, dated March 10, 1896.

Application filed November 29, 1895. Serial No. 570,504. (No model.)

*To all whom it may concern:*

Be it known that I, ALFRED HERBERT WHATLEY, of the city of Providence, county of Providence, and State of Rhode Island, have invented a new and useful Improvement in Ball-Bearings; and I hereby declare that the following is a full, clear, and exact description of the same, reference being had to the accompanying drawings, forming part of this specification.

The invention has reference to an improvement in the class of journal-bearings in which the surfaces are held apart by a series of balls, which form a rolling support for the journal.

The invention consists in the peculiar and novel construction of the races in which the balls roll, as will be more fully set forth hereinafter.

In ball-bearings as heretofore constructed the balls are placed into races or channels, parts of which are concaved to fit the balls, and the balls are so confined that they must follow each other closely. Balls rolling in a concave race or channel grind on the wall of the race, because all parts of a rolling ball do not rotate at the same speed, and balls rolling in a race around a bearing at high speed grind on each other.

The object of this invention is to avoid this loss of power taken up by the grinding of the balls on the race and on each other; and to this end I provide the ball-bearing with one or as many races as may be required having inclined flat bearing and supporting faces and make these faces wider than the diameter of each ball, so that as the speed increases the balls may roll farther from the axis and slightly separate, so as not to grind on each other.

Figure 1:
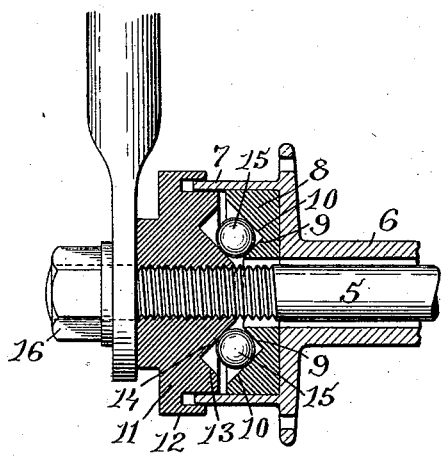
Figure 2:
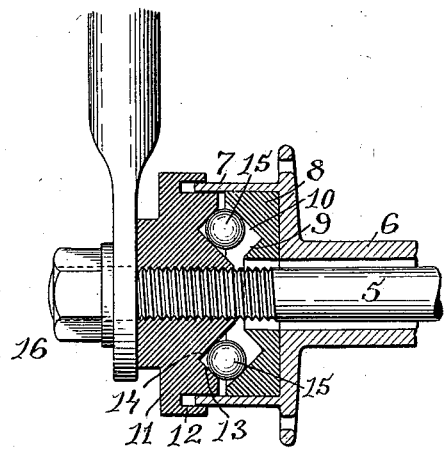
Figure 3:
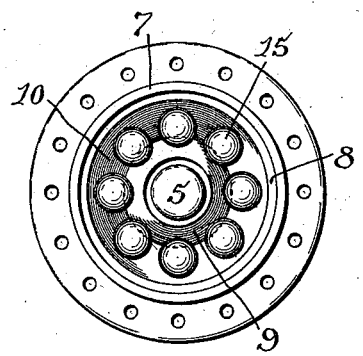
Figure 4:
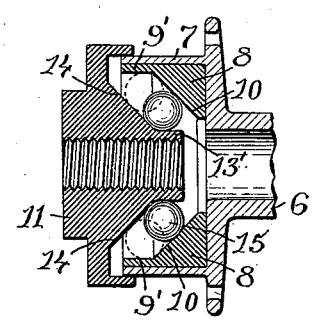

Figure 1 is a sectional view of a ball-bearing constructed after my invention adapted for the end bearing of a bicycle-shaft, showing the balls in the normal position. Fig. 2 is a sectional view, like Fig. 1, showing the balls in the position occupied by them at very high speed. Fig. 3 is an end view of Fig. 2 with the end cone removed. Fig. 4 is a sectional view showing a modified form of the bearing.

Similar numerals of reference indicate corresponding parts in all the figures.

In the drawings, 5 indicates the shaft; 6, the bearing-sleeve provided with the journal-cup 7. Within this cup is secured the race-bearing 8, provided with the conical annular shoulder 9 and the inclined annular bearing-face 10. The inclination of this bearing-surface may be varied to suit the conditions of load and speed under which the ball-bearing is to be used. In practice I find an inclination from the axis of the shaft between twenty-five and forty-five degrees to answer for all the various conditions under which a ball-bearing is used.

The cone-bearing 11 is provided with the annular rim 12, formed to extend over the cup 7, so as to make a sufficiently-tight joint to exclude dust. The cone-bearing is provided with the annular shoulder 13 and the inclined annular bearing-face 14, which is parallel with the face 10. Between the two inclined faces 10 and 14 the series of balls 15 roll and form the ball-bearing. In Fig. 4 the shoulders 9' and 13', while placed at a different angle with the faces 10 and 14, perform the same function, which is to limit the radial travel of the balls.

The cone 11 is secured to the shaft 5 and turns with the same. It can be readily adjusted with reference to the race-bearing 8 by the nut 16. In this bearing, when turning at slow speed, the balls 15 occupy the positions shown in Figs. 1 and 4 near the shaft. As the speed increases the balls rise up on the incline and separate from each other, as is shown in Fig. 3, because the natural tendency of the balls is to travel in a tangential line rather than on a curve, and this tendency, assisted by the centrifugal force exerted on the balls rolling at high speed around the shaft, lifts them up on the inclined race and separates the same, so that the balls do not grind on each other and therefore move with less friction.

In practice I find that this construction of ball-bearing turns with the exertion of less force than is required with the ball-bearing as heretofore constructed.

Having thus described my invention, I claim as new and desire to secure by Letters Patent—

1. A roller-bearing provided with a race for the balls consisting of two flat inclined surfaces of greater width than the diameters of the balls on which the balls roll, substantially as and for the purpose described.

2. In a roller-bearing, the combination with the race-bearing 8 having the flat annular shoulder 9, the annular inclined face-bearing 10 of greater width than the diameters of the balls, and the balls 15, of the cone 11, having the annular shoulders 13 and the flat annular inclined face-bearing 14 of greater width than the diameters of the balls, constructed to permit the balls to move radially, as described.

3. A roller-bearing provided with a race for the balls, consisting of two inclined annular surfaces parallel to each other and forming an inclined annular raceway the inclined parallel bearing-surfaces of which are wider than the diameter of the balls, whereby the balls may roll diagonally outward, as and for the purpose described.

In witness whereof I have hereunto set my hand.

ALFRED H. WHATLEY.

Witnesses:
JOSEPH A. MILLER, Jr.,
M. F. BLIGH.